United States Patent
Neidhardt

(10) Patent No.: US 7,698,937 B2
(45) Date of Patent: Apr. 20, 2010

(54) METHOD AND APPARATUS FOR DETECTING DEFECTS IN OILFIELD TUBULARS

(76) Inventor: Deitmar J. Neidhardt, 129 Grogans Point Rd., The Woodlands, TX (US) 77380

( * ) Notice: Subject to any disclaimer, the term of this patent is extended or adjusted under 35 U.S.C. 154(b) by 189 days.

(21) Appl. No.: 11/975,290

(22) Filed: Oct. 18, 2007

(65) Prior Publication Data

US 2009/0101337 A1    Apr. 23, 2009

(51) Int. Cl.
*E21B 33/00*    (2006.01)
*A61B 5/04*     (2006.01)

(52) U.S. Cl. .................... 73/152.57; 73/865.8

(58) Field of Classification Search .............. 73/622, 73/623, 152.57, 865.8; 166/166, 250.01; 376/249

See application file for complete search history.

(56) References Cited

U.S. PATENT DOCUMENTS

| | | | | |
|---|---|---|---|---|
| 3,810,384 A | * | 5/1974 | Evans | 73/611 |
| 4,378,838 A | * | 4/1983 | Ogden et al. | 166/153 |
| 4,641,529 A | * | 2/1987 | Lorenzi et al. | 73/601 |
| 4,733,380 A | * | 3/1988 | Havira | 367/35 |
| 4,807,484 A | * | 2/1989 | Goedecke | 73/865.8 |
| 5,285,689 A | * | 2/1994 | Hapstack et al. | 73/623 |
| 5,370,006 A | * | 12/1994 | Zollinger et al. | 73/865.8 |
| 5,454,267 A | * | 10/1995 | Moreau et al. | 73/623 |
| 5,454,276 A | * | 10/1995 | Wernicke | 73/865.8 |
| 5,460,046 A | * | 10/1995 | Maltby et al. | 73/623 |
| 5,565,633 A | * | 10/1996 | Wernicke | 73/865.8 |
| 5,574,223 A | * | 11/1996 | Kiefer | 73/623 |
| 5,770,800 A | * | 6/1998 | Jenkins et al. | 73/623 |
| 5,947,213 A | * | 9/1999 | Angle et al. | 175/24 |
| 6,904,818 B2 | | 6/2005 | Harthorn et al. | |
| 7,082,822 B2 | | 8/2006 | Harthorn et al. | |
| 7,181,985 B2 | * | 2/2007 | MacMillan et al. | 73/865.8 |
| 7,234,347 B2 | | 6/2007 | Harthorn et al. | |
| 2003/0136195 A1 | | 7/2003 | Krieg et al. | |
| 2003/0183022 A1 | * | 10/2003 | Sapelnikov et al. | 73/865.8 |
| 2003/0188589 A1 | * | 10/2003 | Harthorn et al. | 73/865.8 |
| 2005/0126316 A1 | * | 6/2005 | Richter et al. | 73/866.5 |
| 2006/0071663 A1 | | 4/2006 | Stanley et al. | |
| 2006/0202700 A1 | | 9/2006 | Barolak et al. | |

OTHER PUBLICATIONS

R. van Agthoven, "Ultrasonic Inspection of Risers a new and Simple Approach," NDT.net, Vo. 3 No. 11, Nov. 1998.*
Brochure, Oceaneering, Pipeline Repair Systems(PRS); Apr. 2007, pp. 1-8.
Brochure & Insert, NDT Systems and Services AG, LineExplorer, Jul. 2006, pp. 1-12 +insert.
Insert, Pieso Technologies, Downhole Transducer General Specifications, Jun. 2006, pp. 1-2.

* cited by examiner

*Primary Examiner*—John Fitzgerald
(74) *Attorney, Agent, or Firm*—Browning Bushman P.C.

(57) ABSTRACT

A sensor system for detecting defects in a tubular string while positioned in the well includes a sensor tool (10) comprising a plurality of circumferentially spaced sensors (40) arranged in two or more axially spaced rows. A plurality of sensors are positioned in each row, with each sensor positioned on one of a plurality of sensor support pads. Sensors within a row may include sensors with axes inclined at different angles, and each of the plurality of sensor pads may move from a radially retracted run-in position to a radially extended sensing position. A flexible line (50) may be used for lowering a sensor tool in the well and retrieving the sensor tool from the well.

28 Claims, 6 Drawing Sheets

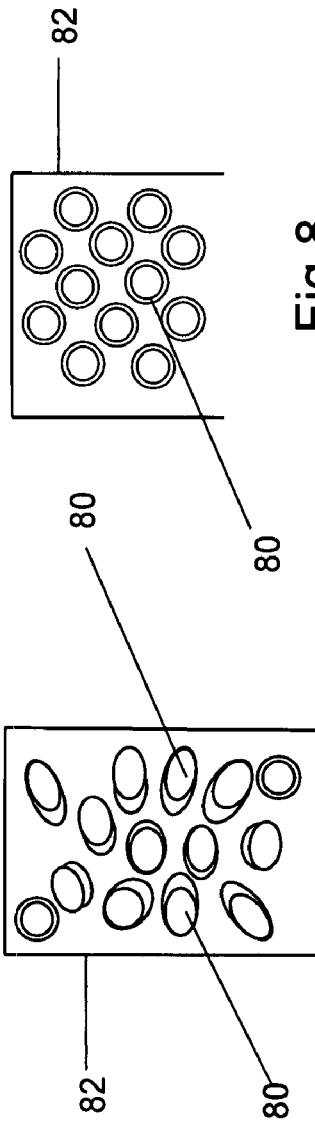
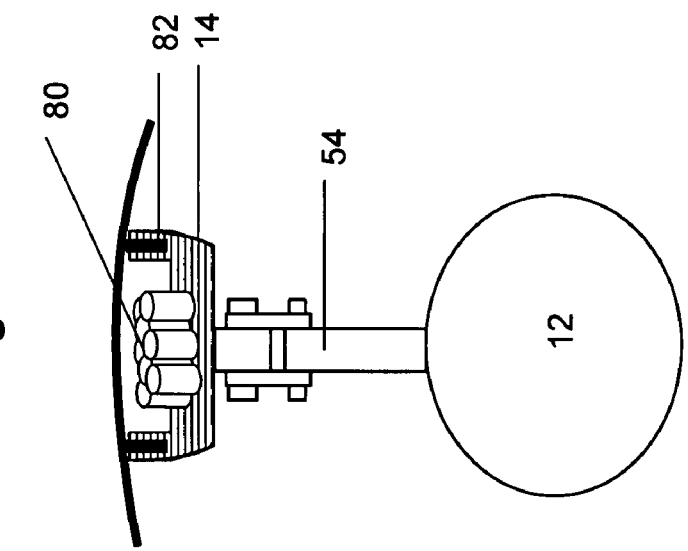
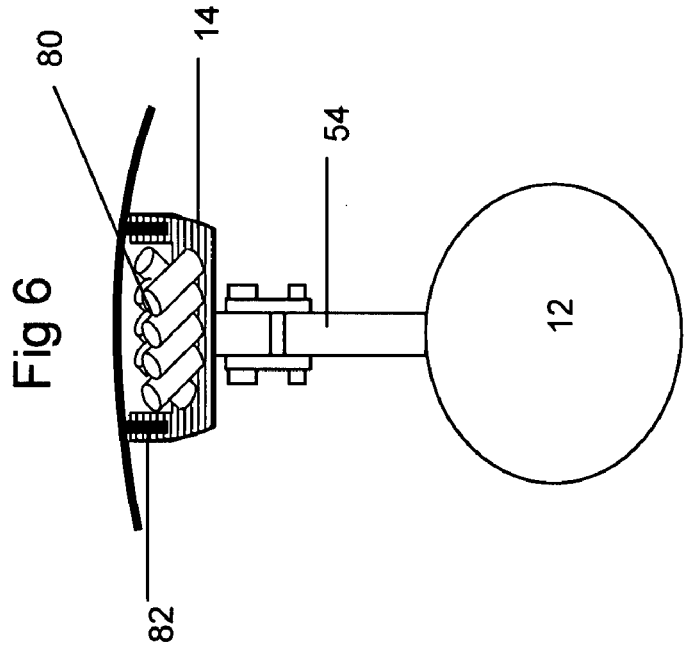

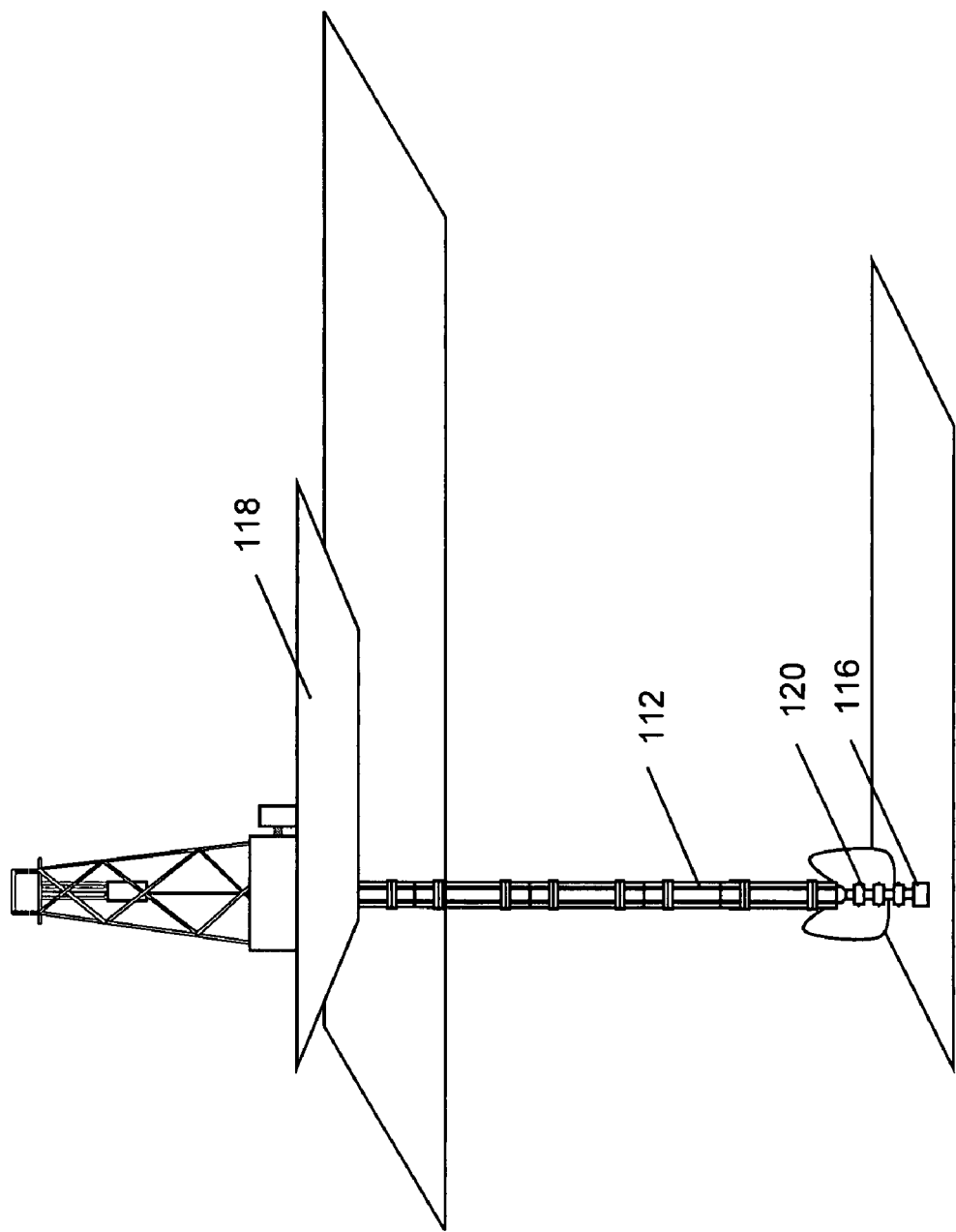

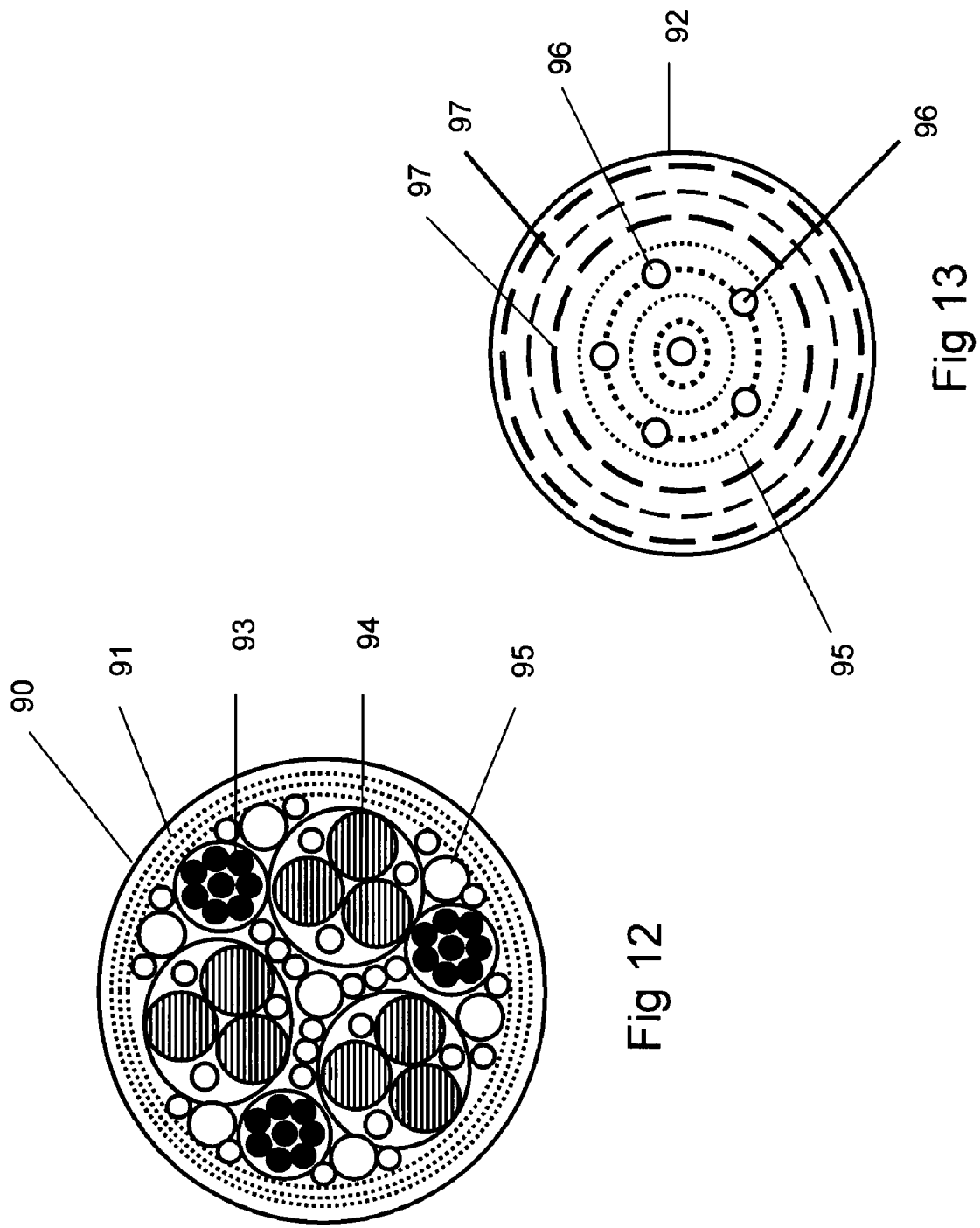

METHOD AND APPARATUS FOR DETECTING DEFECTS IN OILFIELD TUBULARS

FIELD OF THE INVENTION

The present invention relates to techniques for detecting defects, such as corrosion or cracks, in an oilfield tubular while the tubular remains in situ in the well. More particularly, the invention relates to an improved technique for detecting defects in risers commonly used in subsea drilling and production operations.

BACKGROUND OF THE INVENTION

Various techniques have been used for detecting defects in metal flowlines. "Pigs" have been pumped through pipe liner for decades to of detect corrosion or cracks in the pipeline. The method and operation of a detection tool is considerably different, however, for oilfield applications, wherein the tubulars are conventionally inspected after they have been disassembled from the tubular string. Oilfield tubulars descend in a generally vertical direction within a well, and various types of connections are used to couple oilfield tubulars, thereby creating various types of problems when a sensor passes by an interface. Pipeline sections are conventionally welded and "smart pigs" are pumped through pipelines of a considerable distance to detect defects.

U.S. Pat. No. 6,904,818 discloses a device for detecting defects in a riser with ultrasonic transducers. The unit is self-propelled, and a portion of the inspection unit is rotatable relative to the remainder of the unit. Sensor shoes are moved between a retracted and an extended position by pneumatic cylinders or by outwardly biased springs. The inspection unit travels to a selected location, stops, and takes a measurement, preferentially with the shoe, in direct contact with the well. The inspection unit is intended to take measurements only when the unit is at a fixed location in the pipeline.

U.S. Pat. Nos. 7,082,822 and 7,234,347 disclose an improved device compared to the '818 patent for inspecting a riser. The sensors are enclosed in a vessel, which is run in on a wireline. The housing provides the protection for the internal sensor components. An acoustic liquid is provided so that signals travel through metal components, through acoustic fluid, through a metal component, and in some cases through another acoustic fluid and another metal component, before the signals reach the target.

The disadvantages of the prior art are over come by the present invention, and a new non-destructive inspection technique is hereinafter disclosed for reliably protecting oilfield tubulars while the tubular remains in the well.

SUMMARY OF THE INVENTION

A non destructive ultrasonic inspection unit senses defects in a tubular while remaining in situ, and without the need to bring the tubular to surface for inspection. Should cracks or wall thickness loss be identified, the sizing of the defect on location and in real time allows the offshore operator/drilling contractor to make a knowledgeable decision as to when and how to proceed with remediation of any defect encountered.

According to one embodiment, a sensor system is provided for detecting defects in a tubular string while the tubular string is positioned within a well. The system includes a sensor tool which comprises a plurality of circumferentially spaced sensors arranged in two or more axially spaced rows. The plurality of sensors positioned in a row are each positioned on one of a plurality of engagement pads each having a radially outer surface radially outward of a respective sensor. The plurality of sensors in a row include sensors with sensor axes inclined at different angles and different orientations for scanning tubular string defects while the sensor tool is moved through the tubular string. A flexible line is preferentially used for lowering the sensor tool in a well and retrieving the sensor tool from the well. Alternatively, a pressure cup on the sensor tool may be used for pumping the tool down the well.

In yet another embodiment, a sensor system includes sensor pads which are positioned in two or more axially spaced rows, and the sensor pads are radially moveable from a radially inward position for running the sensor tool in the well and a radially outer position wherein each of a plurality of sensor pads is closely adjacent the inner surface of the tubular being inspected. Each sensor pad may have a high strength wear surface for engaging an inner surface of the tubular, with an outer surface of the sensor protected by that wear area being recessed, e.g., 0.25 inches or less, from the wear surface. In some embodiments, the sensed data may be reliably transmitted to the surface in real time, and the sensed data may be selectively regenerated.

These and further features and advantages of the present invention will become apparent from the following detailed description, wherein reference is made to the figures in the accompanying drawings.

BRIEF DESCRIPTION OF THE DRAWINGS

FIG. 5 is a top view of a suitable sensor pad.

FIG. 6 is a front view of the sensor pad shown in FIG. 5.

FIG. 7 is a top view of an alternative sensor pad.

FIG. 8 is a front view of the alternate sensors shown in FIG. 7.

FIG. 11 illustrates a suitable drilling riser application to be inspected by the inspector tool.

FIG. 12 is a cross-sectional view of a suitable metallic flexible line.

FIG. 13 is a cross-sectional view of a composite flexible line.

DETAILED DESCRIPTION OF PREFERRED EMBODIMENTS

In one embodiment, the inspection tool 10 is connected to a flexible line or cable 50, which in turn is spooled on a drum, which may be located in a logging unit placed on the deck of a subsea drilling or production vessel or platform. The tool operation and movement may be controlled by the wire line logging unit and its operator during all the stages of activity. A multi-conductor cable 50 may serve as a conduit for commands sent to the tool and information data obtained by the tool during the process calibration and the measuring activities. Data transmitted by the tool may be directly forwarded into the surface computer system, typically located in the logging unit, allowing for real time data read out and analyses on site. Areas of particular interest along the tubular string may be repeatedly inspected without the need for pulling the tool to surface. The obtained results on the inspected tubular may assist in making intelligent decisions about the handling and the maintenance of the tubular during future operational requirements.

Figure 2:
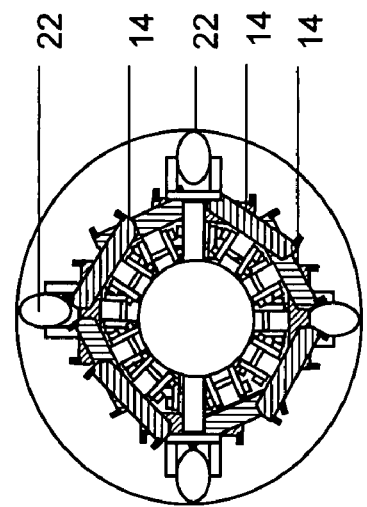
FIG. 2 is a cross sectional view of a portion of the tool shown in FIG. 1.
Figure 1:
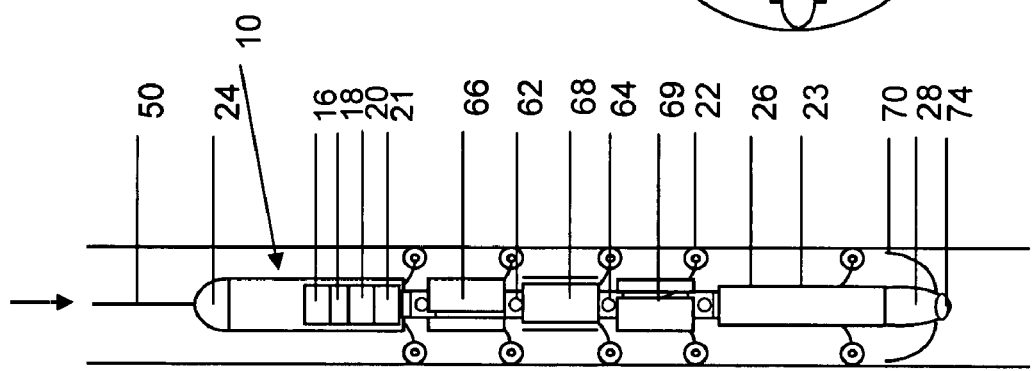
FIG. 1 is a side view of a simplified tool positioned within an oilfield tubular according to the present invention while run in a well.

Referring to FIGS. 1 and 2, the tool may include the following major elements; a tool body 12, preferably cylindrical shaped; a plurality of circumferentially spaced spring loaded sensor pads 14 which may be expanded and retracted, in a controlled manner, onto or from the inner wall of the tubular to be inspected; the pads support sensors 80, as shown in FIGS. 6 and 8, designed for sensing at least cracks and wall thickness defects; a pad activating mechanism 16 to move the sensor pads in the expansion/contraction process; a hydraulic driver 18, along with reservoir 20 and associated piping; a plurality of guide rollers 22; a flexible connector 24 at the top of the tool; and weighting elements 26 and guidance/shock protectors 28 located on the bottom of the tool. The tool may be connected, via a cable connector, to cable or flexible line 50 which extends to the surface wire-line unit.

Figure 3:
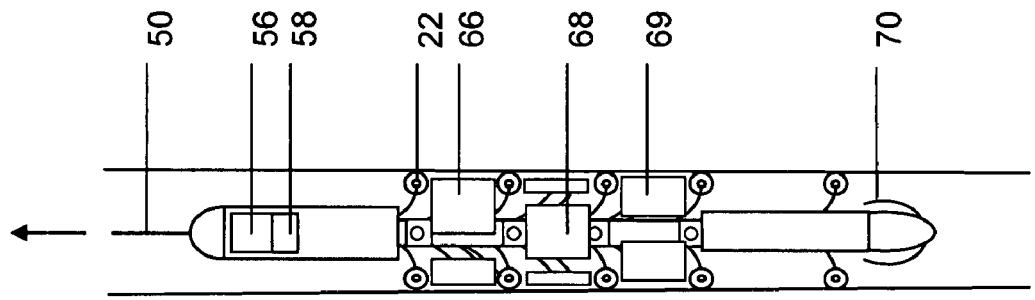
FIG. 3 is a simplified pictorial view of the tool as shown in FIG. 1 when positioned for sensing data while traveling through the tubular.

In one embodiment, the tool incorporates a set of eight wheels or guide rollers 22 to improve tool performance, although any number of rollers 22 may be provided depending on the number and size of the sensors, and the anticipated condition of the tubular. Only four rollers are shown in FIG. 2 for clarity. In this embodiment, the guide rollers reduce friction for both operations (lowering and pulling), and particularly to reduce cable pulling force. This results in the reduction in wear and tear of the tool, and in particular the sensors pads, since the tool does not heavily lean on one side, resulting in one-sided wear. Reduced "sagging" of the tool assures uniform pad contact even when in horizontal positions. In one embodiment, one or more of the rollers 22 may include an odometer 23, which transmits a readout to the surface to indicate the depth of the tool in the well. Either a roller or a pad may also serve as a girth weld detector, so that welds or other connections between two tubular sections are detected, thereby providing a backup to the odometer. Moreover, the radial position of one or more rollers 22 and/or the pads 14 may serve to provide a caliper signal, thereby providing the operator with information regarding a diameter or cross-section anomaly in the tubular at a certain depth, which may be particularly important if possible damage to the riser is anticipated. When obtaining caliper data from the rollers when the tool is run in the well and the pads are retracted, the signals may serve as a warning to the operator, allowing more accurate caliper data to be obtained at a specific depth when the pads are extended and the tool is pulled to the surface during a measurement. The tool is centralized to assure uniform liquid bypass through all sections of the expanded tool to keep the tool clean through flushing. The stand off allows for homogenous cooling of the tool through heat transfer by allowing liquid access to all significant parts of the tool. Another option is of a retractable pump-down cup 70, as shown in FIG. 1, located on the lower end of the tool. The tool may thus be pumped down to a desired depth with the cup 70 providing a substantial seal with the tubular. When measurements are being taken as shown in FIG. 3, the cup 70 may be retracted.

In one embodiment, the sensor tool 10 includes a tool body with one or more pivot members 62, 64 spaced along the length tool body, thereby forming an upper tool body portion 66, a pivot member 62, and a lower tool body portion 68. The sensors are thus arranged in vertically spaced rows, with each row including a plurality of circumferentially spaced pads supporting the sensors. The pivot design allows the tool to pass more easily through a bend in the tubular when in the sensors are in the retracted position, and also facilitates accurate measurement and minimizes excessive pull on the flexible line when pulling the tool upward during the measurement. Two or more rows of sensors may be provided between any two pivot members. Some embodiments may include a powered tractor, as discussed below. If the inspection tool is operating with relatively clear fluids within the tubular, a camera 74 as shown in FIG. 1 may be mounted along the tool, and preferably near the lower nose of the tool, so that real time visual inspection of a defect is possible about the entire circumference of the tubular.

An array of ultrasonic emitters/receivers are arranged such that the sensors located on the pads are able to cover substantially the 360° circumference of the wall surface to be inspected. These emitters/receivers may also be arranged in a plurality of angular positions and orientations in reference to the surface of the wall to be measured for highly reliable wall-loss and crack detection. Sensors each with an axis perpendicular to the inner wall surface, as shown in FIG. 8 may be used for wall thickness/metal loss detection. Other sensors may have their axes angled rather than perpendicular to the surface/wall of the tubular for crack detection, as shown in FIG. 6.

Figure 4:
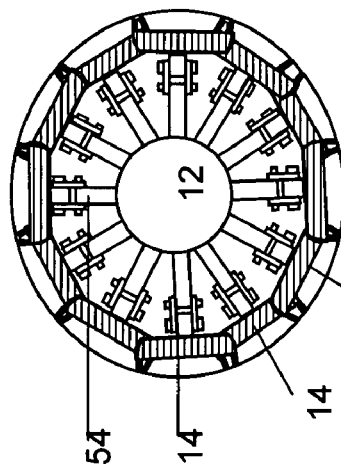
FIG. 4 is a cross sectional view of the tool as shown in FIG. 3.

A comparison of FIGS. 2 and 4 illustrates the pads 14 with the sensors thereon in a radially retracted position when the tool is run in the well, and in a radially extended position when the tool is pulled upward through the tubular string during a sensing operation. The pads are arranged in two or more rows, so that the pads circumferentially overlap when in the retracted position, and provide substantially 360° coverage as shown in FIG. 4 when in the radially extended position. When in the extended position, the circumferential length of pads within their respective wear surfaces, as discussed below, preferably also circumferentially overlap, so that every surface of the tubular is inspected by one or more sensors. This feature is one of the reasons for providing three or more rows of sensors.

The disclosed pad activating mechanism 16 includes pivot arms 54 which may pivot with respect to the tool body 12, with each pad 14 being pivotally connected to the outward end of a respective arm 54. As disclosed herein, a conventional hydraulic driver 18 along with reservoir 20 may be used to stroke the pad activating mechanism 16 and thereby radially expand or radially contract the pads. The pad activating mechanism 16 alternatively may be provided with hydraulic cylinders or an electric motor to control pad movement.

FIG. 5 illustrates one sensor pad 14 pivotally connected to arm 54, which in turn is supported on tool body 12. The body for the pad 14 may be formed from a hard rubber material, and preferably includes an annular hard faced insert 82, thereby providing a wear surface for engagement with the internal diameter of the tubular. The insert 82 is provided in FIG. 5 on three sides of the pad. The bottom is open (no insert) to allow fluid and debris to pass out from between the pad and the tubular well. In another embodiment, the inserts 82 are provided on both sides of the pad, which is open on both the bottom and the top. FIG. 6 is a front view of the sensor pad 14, with circumferential wear members 82 substantially surrounding a plurality of sensors. In this case, the sensors 80 are angled or inclined at different angles and orientations relative to the internal wall of the tubular, which is particularly advantageous for detecting cracks and wall loss. The sensor pad 14 as shown in FIG. 7 is similarly provided with wear surfaces 82, and FIG. 8 illustrates that the sensors 80 each have an axis which is substantially perpendicular to the inner wall of the tubular, thereby making the sensor particularly sensitive to wall thickness and metal loss detection.

Each of the sensor pads 14 may thus includes a hard carbide facing 82, thereby providing a minimum radial spacing between the radially outer surface of the pad and a radially outer surface of the sensor, whether an emitter or a receiver. The outer wall of a sensor may thus practically be as close as possible to the inner wall of the tubular without damaging the sensor. In some applications, the radial spacing between the wear surface on a pad and the sensors supported on that pad will be 0.25 inches or less. These sensor pads could also carry sensors/emitters for the following measurement technologies: MFL=magna-flux-leakage (circumferential as well as coaxial); TFI=transverse flux indication; eddie-current; phased array; and EMAT electric magnetic acoustic transducer. A combination of sensor technologies may be suitable for many applications. Also, some of the single processing from the sensors may be performed with electronics within each pad 14. This feature further reduces the diameter of the tool body and allows for better use of battery and memory storage.

When the plurality of sensor pads are in the radially outward or extended position, a substantial annular gap is provided between the sensor pads and inner surface of the tool body. Limited fluid flow between the sensor pads may also occur. This annular gap is highly desirable, particularly when inspecting a production riser, since fluid flow to the surface may be restricted but need not be stopped while the riser is inspected.

As discussed above, a suitable biasing member for forcing the pads to the radially outward position may include hydraulic driver 18. An electrically powered motor or spring released biasing member alternatively may be provided. An adjustment member 21 as shown in FIG. 1, such as a hydraulic controller, may be used to selectively adjust the bearing force to a selected pad from the surface, e.g., to "lift" a tool upward toward the center of an inclined or horizontal tubular.

When a tool is used for inspecting a drilling riser, significant advantages are obtained since the operator may know which riser section should be replaced before the riser string is returned to the surface. A new riser section already at the site may be inserted in the riser stack when the string is pulled, and the defective riser section removed from the area. Significant savings are obtained because information regarding the riser is transmitted in real time to the surface.

The tool may contain batteries 56 and/or an electronics unit 58, as shown in FIG. 3, for later download or recording of data as a backup. This feature is particularly suitable for a production riser which does not require real-time surface readout. The uses of batteries and/or electronic units on the tool allows the tool to use a much lighter umbilical or flexible line, which is particularly important for ultra deep risers.

When an inspection tool is used in a production riser, it is less important that the data be transmitted to the surface in real time, and instead data may be stored downhole and reviewed when the tool returns to the surface. Remedial action taken in response to that data may result in an external repair of the subsea riser section, but immediate action as the data is taken typically is not necessary.

By providing real-time readout at the surface, it is relatively easy for an operator, when reviewing data for a drilling riser, to return the tool to the retracted position, lower the tool back in the well beneath the area of interest, expand the tool to the radially extended position, then continue to take data during a second pass of the area of interest. It is also possible to make changes to the sensor tool which may clarify the magnitude of the defect. Second and third passes of the tool for an area of interest are feasible for certain applications.

Figure 9B:
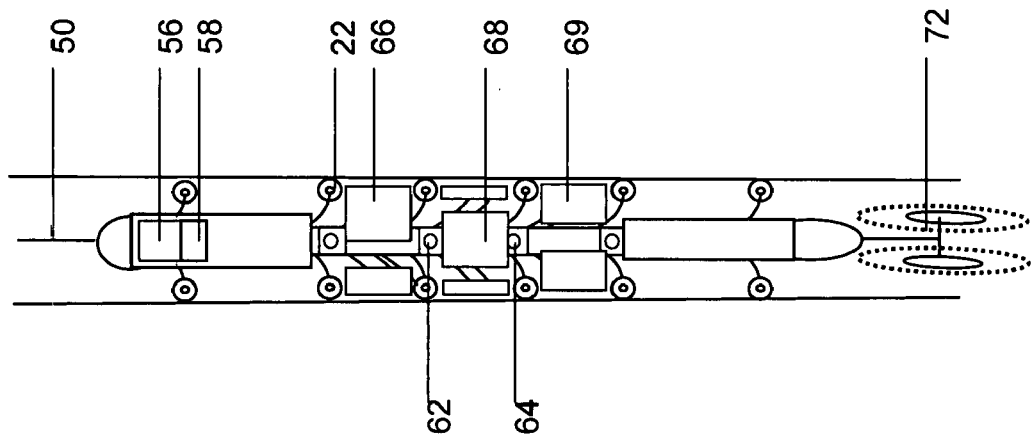
FIGS. 9a and 9b illustrate an inspection tool passing through a bend in the tubular.
Figure 9A:
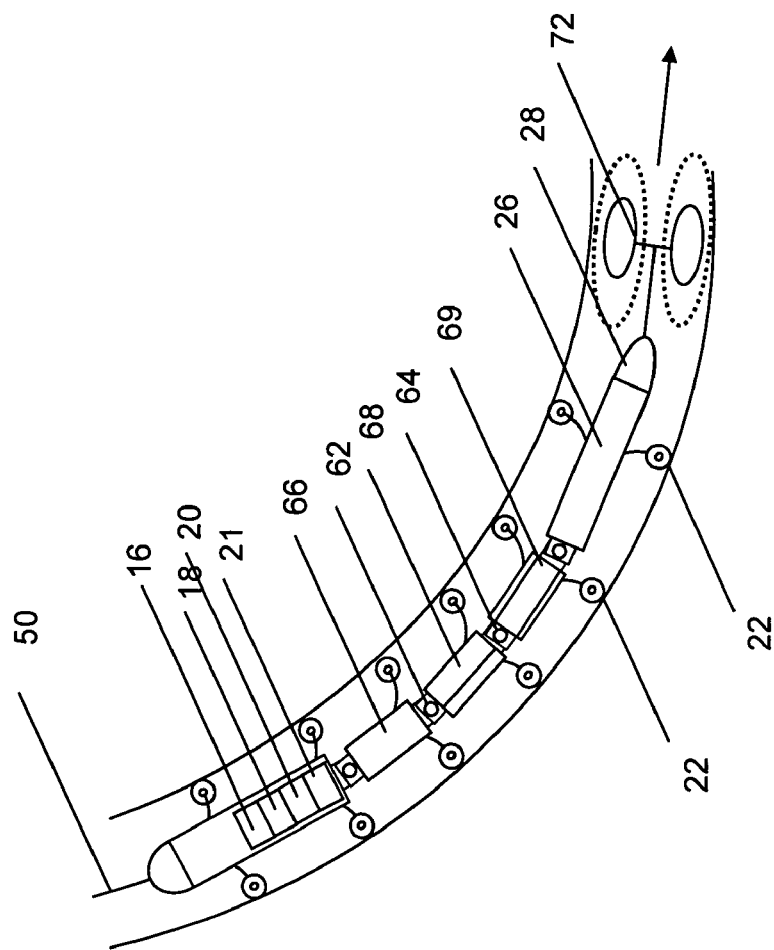

FIG. 9a illustrates the inspection tool 10 passing through a bend in the tubular. The pads are in their retracted position, and the rollers 22 guide the tool as it is lowered through the bend on the wireline 50. Pivot member 62, 64 allow pivoting of sections of the tool body. FIG. 9a also conceptually depicts a conventional tractor 72 at the lower end of the tool for being powered to pull the tool through the bend or through a generally horizontal portion of the tubular.

FIG. 9b illustrates the tool as shown in 9a with the tractor 72 in the retracted position, and the pads 66, 68, 69 in the extended position as the tool is being pulled to the surface through the tubular by the wireline 50. The rollers 22 may still maintain contact with the inner surface of the tubular as the tool is pulled to the surface.

Figure 10:
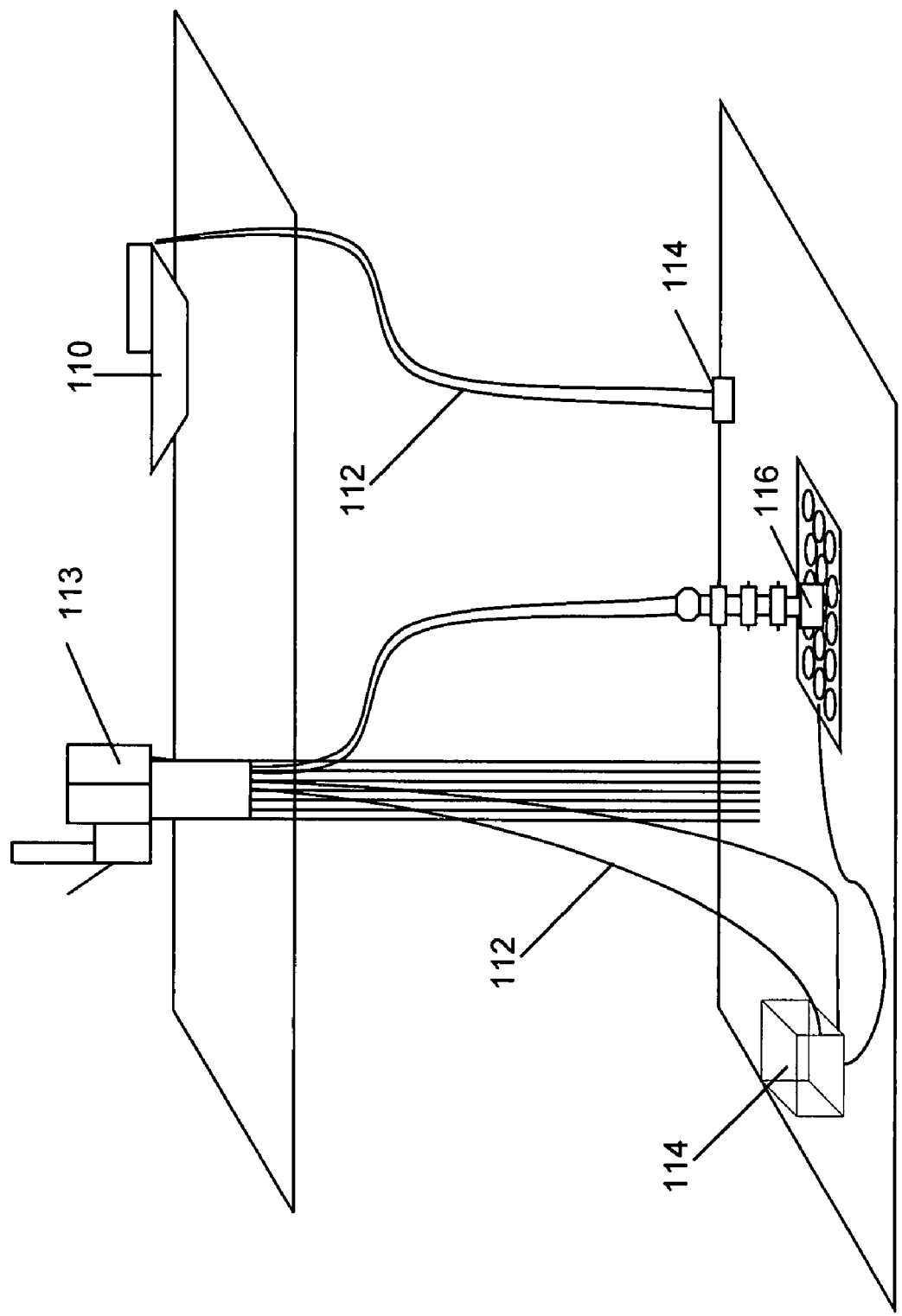
FIG. 10 illustrates a suitable production riser application to be inspected by the inspection tool.

FIG. 10 shows a floating production vessel 110 as well as a production platform 113. On the sea-bed, the riser 112 is connected to the subsea production head 114, which in turn is connected onto wellhead 116. Between each of the production platforms 113 and 100 and a respective subsea production head 114, the riser 112 has no fixed point of suspension and is exposed to vessel movement, wave-action, heave and subsea currents.

The riser is generally composed of welded joints and is designed according to the expected life of the field. It remains in place throughout the production cycle. Although such a riser is seldom inspected for any type of defect, it occasionally may be inspected from outside the tubular with ROV's (Remote Operated Vehicles), depending on water depth.

The continuous movement of the floating vessel, as well as water currents and wave/heave movements, expose the riser to VIV (Vortex-Induced-Vibration), in particular beneath the vessel and above the subsea riser connector. These movements induce stress on the riser which can cause cracks to develop in the riser wall. Additionally, the product within the riser contains various levels of water, solids and sometimes $H_2S$. These products may be corrosive and can cause internal damage to the riser wall, resulting in wall loss and reduced strength of the riser body. Similar corrosion can occur when the outer protective coating on the riser is damaged. Seawater and electrolytic exchange may cause a stead deterioration of the riser wall integrity through wall loss.

FIG. 11 shows a drilling riser 112 suspended beneath the floating drill vessel 118. On the sea bed, the riser is connected to the BOP 120, which in turn is latched onto the wellhead 116 and permanent base plate. Between these points, the riser is exposed to various movements. When the riser is pulled, it is broken up in joints and laid down in the riser rack, joint by joint. Running in the riser is the reverse operation. Sometimes, when drilling several wells from the same template, the drilling riser is disconnected and moved over to the next wellhead without pulling the same.

The continuous movement of the floating drilling vessel, as well as water currents and wave/heave movements, expose the drilling riser to VIV (Vortex-Induced-Vibration), in particular beneath the drilling vessel and above the BOP. These movements induce stress on the drilling riser which can cause cracks to develop in the riser wall. Due to the VIV, the riser is never completely vertical and as a consequence mechanical damage might be caused to the inside of the riser through any hardware temporarily passing through or being suspended in the same. Such hardware could be drill pipes, drill collars, completion equipment and any other equipment used for well intervention. The same applies for drill solids traveling up in the riser, which could cause severe washouts.

As shown in FIG. 12, one embodiment of a flexible line may comprise a metallic and armored signal and energy transfer line 90 to power and activate the tool. This is of particular benefit when inspecting a drilling riser since this type of flexible line allows for multiple expansions and retractions of the tool pads, which might deplete downhole batteries. Line 90 may include an outer armor 91 of multiple layers, along with an outer coating. A plurality of transfer cables 93 are provided, along with power/data cables 94 and buffer lines 95. When the tool is used for inspection of a production riser, immediate signal transfer is not required, and the flexible line preferably has both the ability to pull the tool and to transmit some signals, such as signals to open or close the sensor pads, to operate a tractor, or to open a valve within the tool. In another embodiment as shown in FIG. 13, a composite material may be used for the flexible line 92, thereby significantly reducing the weight of the flexible line compared to conventional steel. Tensile strength strips 97 may be provided for strength and pressure reinforcement. A plurality of fiber optical lines 96 may be used in conjunction with the composite material line. Buffer lines 95 may also be used. The composite cable 92 may be composed of various fiber, such as Kevlar™, carbon fiber rod and S-glass. Depending on the requirements, the cable 92 need not contain metal elements. The composition of the material and the wrapping of the selected material may provide the required tensile and compression strength. The composite cable is light weight and not abrasive to the inside of the liner. The fiber-optic elements within the wrapping allow for communication and data transfer to and from the tool.

The tool when used on a drilling riser may require a minimum of onboard power, such as emergency backup, this power is readily available from a flexible line. The tool thus has full hydraulic, electrical, mechanical capabilities. The tool may be quickly contracted, lowered in a well, and then reexpanded for repeat measurements. The tool may also be lowered directly into an open ended drilling riser, frequently without requiring a stuffing box. A scraper and/or brush tool may be run through the tubular on a work string before the tubular string is inspected if there is concern about solids sticking to the internal wall of the tubular after a conventional cleaning or circulating operation.

The inspection tool when used within a production riser may benefit from a composite umbilical line, with an optical wire embedded for signal transfer. The inspection unit preferably has a significant onboard power memory and processing capability, although its mechanical expansion and contraction capabilities may be limited. While retaking of a measurement is certainly possible, retaking production riser measurements is not expected at the frequency of drilling risers measurements. The tool desirably has a high flow through between the sensor pads and the tool body when the pads are in the extended position. When the pads are retracted, the annulus between the tubular and the pads is sizable. A stuffing box may be lowered onto the riser to maintain production at a reduced rate.

The inspection tool is thus able to detect various types of defects in an oilfield tubular, including corrosion loss, pitting, cracks, and wall thickness defects. While the tool as disclosed herein has been discussed particularly for inspection of production risers and drilling risers, the inspection tool may be used on other oilfield tubulars, including casing, tubing and similar oilfield tubular goods that are used in recovering fluids from a well.

The process for using the tool is discussed below.

1. The sensor tool may be connected on surface to the multi-core wire-line cable and undergoes a sequence of function tests, certifying its operational readiness.
2. The riser is preferably displaced to seawater or oil.
3. The BOP-rams, production riser seals or sub sea safety valves are closed.
4. The sensor tool is lowered into the riser or other tubular to be inspected with cable rollers equipped with weight indicators.
5. The sensor tool travels to the top of the closed well head.
6. The sensor tool is lowered and picked up several times for depth confirmation.
7. The sensor tool is kept in position and the sensor pads are expanded to the wall.
8. The sensor tool is calibrated while at a known depth.
9. Upon successful calibration, the tool is pulled by the wire-line unit operator to surface at a predetermined measuring speed (depending on tool characteristics and accuracy requirements).
10. Should the tool encounter any anomalies of significance the process may be stopped at any time and proceeded as follows:
    a. The tool pads are collapsed.
    b. The tool is lowered to several joints below the anomaly (for confirmation).
    c. With the tool in place the tool pads are expanded and calibrated.
    d. The interval of interest undergoes a repeat inspection.
    e. This process can be repeated at any time, as desired by the customer.
11. The tool run is completed by pulling the sensor tool to the surface.
12. The run is reviewed by the customer and the sensor tool service engineer on site.
13. If required, satellite communication allows for discussion with headquarters.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A sensor system for detecting defects in a tubular string while positioned within a well, the system comprising:
    a sensor tool comprising a plurality of circumferentially spaced sensors arranged in two or more axially spaced rows;
    a plurality of sensors positioned in a row, each sensor positioned on one of a plurality of sensor support pads each having a radially outer surface radially outward of a respective sensor, the plurality of sensors in one of the two or more rows including sensors with sensor axes inclined at different angles relative to a tool central axis for scanning tubular string defects while the sensor tool is moving through the tubular string, the plurality of sensor pads in the two or more rows providing substantially 360° coverage of the tubular string within the well as the sensor tool is moved axially through the tubular string, and a spacing between the tool body and each of a plurality of sensor pads when in a radially extended sensing position providing an axially extending fluid flow channel through the tubular string and past the sensor system;

one or more pivot members positioned along the length of the sensing tool to allow pivoting of a lower tool body supporting a lower plurality of sensors from an upper tool body supporting an upper plurality of sensors; and a flexible line connected to the sensor tool for lowering the sensor tool in the well and retrieving the sensor tool from the well.

2. A system as defined in claim 1, wherein the flexible line includes an electrical conductor for transmitting data from the plurality of sensors to the surface in real time.

3. A system as defined in claim 1, wherein a composite material line supports the tool in the well, and a fiber optic line adjacent the composite material line transmits data from a plurality of sensors to the surface in real time.

4. A system as defined in claim 1, further comprising:
a plurality of rollers spaced for centralizing the sensor tool in the well prior to the plurality of sensor pads moving radially outward to a sensor position wherein one or more of a plurality of rollers includes a odometer for detecting a depth of the sensing tool in the well for transmitting a signal in real time to the surface.

5. A system as defined in claim 1, further comprising:
each sensor pad including a wear surface circumferentially spaced from a respective sensor, the wear surface formed from a wear resistant material, with a radial spacing between a radially outer surface of the wear surface and a radially outer surface of the respective sensor defining a gap of less than about 0.25 inches.

6. A system as defined in claim 1, further comprising:
a pump down cup for pumping the tool downward in response to fluid pressure above the pump down cup.

7. A system as defined in claim 1, further comprising:
a tractor at a lower end of the sensor tool, the tractor powered for pulling the sensor tool through a bend.

8. A system as defined in claim 1, further comprising:
the battery pack powering the plurality of sensors.

9. A system as defined in claim 1, wherein each of the plurality of sensor pads moves from a radially retracted run-in position to a radially extended sensing position.

10. A system as defined in claim 9, further comprising:
a biasing member for biasing a respective pad to a radially outward position; and
an adjustment member for selectively adjusting the biasing force to a biasing member.

11. A system as defined in claim 9, further comprising:
a plurality of rollers spaced for centralizing the sensor tool in the well prior to the plurality of sensor pads moving radially outward to the sensing position; and
a caliper for sensing a radial position of at least one of the plurality of rollers, and the plurality of sensor support pads sense a structural anomaly in the tubular.

12. A sensor system for detecting defects in a tubular string while positioned within a well, the system comprising:
a sensor tool comprising a tool body and a plurality of circumferentially spaced sensors arranged in two or more axially spaced rows;
a plurality of sensors positioned in one of the two or more rows, each sensor positioned on one of a plurality of sensor support pads each having a radially outer surface radially outward of a respective sensor, the plurality of sensor pads in the two or more rows providing substantially 360° coverage of the tubular as the sensor tool is moved axially through the tubular string;
each of the plurality of sensor pads moves from a radially retracted run-in position to a radially extended sensing position, each sensor being closely adjacent an inner surface of the tubular string when the supporting sensor pad is in the extended sensing position;
a plurality of rollers from the plurality of sensor pads spaced for centralizing the sensor tool in the well prior to the plurality of sensor pads moving radially outward to the sensing position, each of the plurality of rollers having a radially movable roller axis; and
a flexible line for lowering the sensor tool in the well and retrieving the sensor tool from the well.

13. A system as defined in claim 12, wherein a spacing between the tool body and each of a plurality of sensor pads when in a radially extended sensing position provide an axially extending fluid flow channel through the tubular string and past the sensor system.

14. A system as defined in claim 12, wherein a composite material line supports the tool in the well, and a fiber optic line transmits data from a plurality of sensors to the surface in real time.

15. A system as defined in claim 12, further comprising:
a biasing member for biasing a respective pad to the radially extended position; and
an adjustment member for adjusting the biasing strength of the biasing member.

16. A system as defined in claim 12, wherein the tool body includes one or more pivot members spaced along the tool body, such that an upper tool body portion may pivot with respect to a lower tool body portion to facilitate passage of the sensor tool through the well.

17. A system as defined in claim 12, wherein an annular spacing between the plurality of sensor pads when in the extended position and the tool body allows fluid flow in the tubular string while the tool is detecting defects in the tubular string.

18. A sensor system for detecting defects in a tubular string while positioned within a well, the system comprising:
a sensor tool comprising a tool body and a plurality of circumferentially spaced sensors arranged in two or more axially spaced rows;
a plurality of sensors positioned in one of the two or more rows, each sensor positioned on one of a plurality of sensor support pads each having a radially outer surface radially outward of a respective sensor;
each of the plurality of sensor pads moves from a radially retracted run-in position to a radially extended sensing position, such that the plurality of sensor pads in the two or more axially spaced rows circumferentially overlap when the sensor pads are in the retracted run-in position, each sensor being closely adjacent an inner surface of the tubular string when the supporting sensor pad is in the extended sensing position, wherein the sensor pads in the two or more axially spaced rows circumferentially overlap when the sensor pads are in the extended sensing position; and
a flexible line for lowering the sensor tool in the well and retrieving the sensor tool from the well.

19. A system as defined in claim 18, further comprising:
a plurality of rollers spaced for centralizing the sensor tool in the well prior to the plurality of sensor pads moving radially outward to the sensing position.

20. A system as defined in claim 18, wherein the tool body includes one or more pivot members spaced along the tool body, such that an upper tool body portion may pivot with respect to a lower tool body portion to facilitate passage of the sensor tool through the well.

21. A system as defined in claim 18, further comprising:
each sensor pad including a wear surface circumferentially spaced from a respective sensor, the wear surface formed from a wear resistant material, with a radial spacing between a radially outer surface of the wear surface and a radially outer surface of the respective sensor defining a gap of less than about 0.25 inches.

22. A method of detecting defects in a tubular string while positioned within a well, the method comprising:
providing a sensor tool including a plurality of circumferentially spaced sensors arranged in two or more axially spaced rows, each sensor positioned on one of a plurality of sensor support pads, the plurality of sensors pads in the two or more rows providing substantially 360° coverage of the tubular string within the well as the sensor tool is moved axially through the tubular string;
lowering the tool in the tubular string with the sensor pads radially retracted;
radially extending the plurality of sensor support pads such that each of the plurality of sensors is adjacent an interior of the tubular string; and
raising the sensor tool in the tubular string while the sensor pads are extended and sensor measurements are taken.

23. A method as defined in claim 22, further comprising:
transmitting data from the plurality of sensors to the surface in real time.

24. A method as defined in claim 22, further comprising:
positioning a plurality of rollers for centralizing the sensor tool in the well prior to the plurality of sensor pads moving radially outward to the sensing position.

25. A method as defined in claim 22, further comprising:
positioning one or more pivot members along the length of the sensing tool to allow pivoting of a tool body supporting a lower plurality of sensors from the tool body supporting an upper plurality of sensors.

26. A method as defined in claim 22, further comprising:
providing a wear surface on each sensor pad circumferentially spaced from a respective sensor, the wear surface formed from a wear resistant material, with a radial spacing between a radially outer surface of the wear surface and a radially outer surface of the respective sensor defining a gap of less than about 0.25 inches.

27. A method as defined in claim 22, further comprising:
providing a tractor at a lower end of the sensor tool for pulling the sensor tool through a bend.

28. A method as defined in claim 22, wherein the sensor tool is moved axially in the tubular string while the sensor pads are extended and measurements are retaken before the tool returns to the surface.

* * * * *